US012643831B2

(12) United States Patent
Saha et al.

(10) Patent No.: US 12,643,831 B2
(45) Date of Patent: Jun. 2, 2026

(54) SLURRY-BASED METHODS FOR FORMING A BOND COAT AND ARTICLES FORMED BY THE METHODS

(71) Applicant: General Electric Company, Schenectady, NY (US)

(72) Inventors: Atanu Saha, Bangalore (IN); Satya Kishore Manepalli, Bangalore (IN); Nicholas Edward Antolino, Schenectady, NY (US); Don Mark Lipkin, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 1455 days.

(21) Appl. No.: 16/475,882

(22) PCT Filed: Oct. 30, 2017

(86) PCT No.: PCT/US2017/058932
§ 371 (c)(1),
(2) Date: Jul. 3, 2019

(87) PCT Pub. No.: WO2018/128676
PCT Pub. Date: Jul. 12, 2018

(65) Prior Publication Data
US 2019/0375689 A1     Dec. 12, 2019

(30) Foreign Application Priority Data

Jan. 4, 2017     (IN) .............................. 201741000418

(51) Int. Cl.
*C04B 41/00* (2006.01)
*C04B 41/50* (2006.01)
(Continued)

(52) U.S. Cl.
CPC ........ *C04B 41/009* (2013.01); *C04B 41/5024* (2013.01); *C04B 41/5096* (2013.01);
(Continued)

(58) Field of Classification Search
CPC .............. C04B 41/009; C04B 41/5024; C04B 41/5096; C04B 41/52; C04B 41/85; C04B 41/86
See application file for complete search history.

(56) References Cited

U.S. PATENT DOCUMENTS

| | | | |
|---|---|---|---|
| 5,858,144 A | 1/1999 | Barton et al. | |
| 6,820,334 B2 | 11/2004 | Kebbede et al. | |

(Continued)

FOREIGN PATENT DOCUMENTS

EP     1626039 A2 *     2/2006     ............. F01D 5/288

OTHER PUBLICATIONS

Susan et al., "Technical Answering of Refractory Question", Metallurgical Industry Press, Feb. 28, 1994, pp. 59-60.

(Continued)

*Primary Examiner* — Nathan H Empie
(74) *Attorney, Agent, or Firm* — Dority & Manning, P.A.

(57) ABSTRACT

Methods for forming a sintered bond coat (64) on a silicon-based substrate (14) and articles (50) formed by the methods are disclosed. The methods include applying a bond coat slurry on the silicon-based substrate (14), drying the bond coat slurry on the silicon-based substrate to form a dried bond coat (44), and sintering the dried bond coat (44) in an oxidizing atmosphere to form a sintered bond coat (64) on the silicon-based substrate (14). The bond coat slurry includes a bond coat patching material in a bond coat fluid carrier. The articles (50) include a silicon-based substrate (14), a sintered bond coat (64) formed on the silicon-based substrate (14), and a sintered environmental barrier coating (Continued)

(EBC) (66) formed on the sintered bond coat (64). The sintered bond coat (64) includes a silicon-based phase and an oxide of the silicon-based phase.

17 Claims, 3 Drawing Sheets

(51) Int. Cl.

| | |
|---|---|
| *C04B 41/52* | (2006.01) |
| *C04B 41/86* | (2006.01) |
| *F01D 5/00* | (2006.01) |
| *F01D 25/00* | (2006.01) |

(52) U.S. Cl.
CPC .............. *C04B 41/52* (2013.01); *C04B 41/86* (2013.01); *F01D 5/005* (2013.01); *F01D 25/005* (2013.01); *F05D 2220/32* (2013.01); *F05D 2230/41* (2013.01); *F05D 2230/80* (2013.01); *F05D 2230/90* (2013.01); *F05D 2300/222* (2013.01); *F05D 2300/5023* (2013.01); *F05D 2300/611* (2013.01)

(56) References Cited

U.S. PATENT DOCUMENTS

| | | | |
|---|---|---|---|
| 7,029,721 B2 | 4/2006 | Hasz et al. | |
| 7,422,671 B2 | 9/2008 | Bhatia et al. | |
| 8,173,206 B2 | 5/2012 | Boutwell et al. | |
| 9,890,089 B2 | 2/2018 | Kirby et al. | |
| 2007/0050976 A1* | 3/2007 | Jungbluth | B23K 35/30 |
| | | | 29/402.09 |
| 2007/0134408 A1* | 6/2007 | Skoog | C09D 1/00 |
| | | | 427/372.2 |
| 2009/0162674 A1 | 6/2009 | Boutwell et al. | |
| 2009/0297718 A1 | 12/2009 | Sarrafi-Nour et al. | |
| 2010/0237134 A1 | 9/2010 | Bucci et al. | |
| 2010/0255260 A1* | 10/2010 | Lee | C04B 41/52 |
| | | | 428/164 |
| 2010/0255289 A1* | 10/2010 | Lewinsohn | C04B 41/009 |
| | | | 524/588 |
| 2011/0027559 A1* | 2/2011 | Kirby | C04B 35/63408 |
| | | | 428/428 |
| 2011/0059321 A1* | 3/2011 | Skoog | F01D 5/288 |
| | | | 427/140 |
| 2014/0241900 A1 | 8/2014 | Roberts, III et al. | |
| 2015/0174838 A1 | 6/2015 | Kittleson et al. | |
| 2015/0175486 A1 | 6/2015 | Roberts et al. | |
| 2017/0073277 A1 | 3/2017 | Shim et al. | |

OTHER PUBLICATIONS

Machine Translated Chinese Office Action Corresponding to Application No. 201780087715 on Feb. 9, 2022.

Davis et al., "Procedure for Application of Boron-Fibre Reinforced Plastic Patch to the Mirage Lower Wing Skin Fuel Decant Region", Aeronautical Research Labs Melbourne, Aug. 1981.

* cited by examiner

SLURRY-BASED METHODS FOR FORMING A BOND COAT AND ARTICLES FORMED BY THE METHODS

BACKGROUND

This disclosure relates generally to methods for forming a bond coat on a silicon-based substrate using a bond coat slurry and articles having the formed bond coat. More particularly, the disclosure relates to slurry-based methods for generating or repairing a bond coat on a silicon-based substrate and articles having the bond coat formed by said slurry-based methods.

Silicon-based materials are being employed for high temperature components of gas turbine engines such as, for instance, airfoils (e.g., blades, vanes), combustor liners, and shrouds. The silicon-based materials may include silicon-based monolithic ceramic materials, intermetallic materials and composites. Silicon-based ceramic matrix composites (CMCs) may include silicon-containing fibers reinforcing a silicon-containing matrix phase.

Although silicon-based materials exhibit desirable high temperature characteristics, such materials can suffer from rapid recession in combustion environments. For example, silicon-based materials are susceptible to volatilization upon high-temperature exposure to reactive species such as water vapor. In such cases, coatings are used to protect the silicon-based materials. Such protective coatings, such as for example, environmental barrier coatings (EBCs), prevent the degradation of silicon-based materials in a corrosive water-containing environment by inhibiting the ingress of water and the subsequent formation of volatile products such as silicon hydroxide (e.g., $Si(OH)_4$). Thus, an EBC enhances the high temperature environmental stability of silicon-based substrates comprising silicon-based materials. Other desired properties for the EBC include a thermal expansion compatibility with the silicon-based substrate, low permeability for oxidants, low thermal conductivity, and chemical compatibility with the thermally grown silicon-based oxide.

Generally, a bond coat is disposed between a silicon-based substrate and an EBC to promote good adhesion and to act as a barrier to substrate oxidation. By employing bond coat compositions that do not form gaseous oxidation products (e.g., $CO_2$, CO, $N_2$), the bond coat may also help extend the operating life of the silicon-based substrate/EBC system. Some of the desired properties of the bond coat include absence of interconnected porosity, low intrinsic oxygen permeability and thermal expansion coefficient compatibility with the substrate. Silicon and silicon-based alloys have been conventionally used as bond coats. Generally, the bond coat is applied using thermal spray (e.g., air plasma spray) or chemical vapor deposition (CVD) methods.

If an EBC and/or bond coat experiences a localized spall or a pinhole defect, the underlying substrate may be subject to material loss resulting from water vapor-induced volatilization and subsequent surface recession during operation. If allowed to grow unmitigated, such material loss may reduce the load-bearing capability of the component, disrupt airflow, or even progress to through-thickness holes. This can further lead to ingestion of combustion gases or leakage of high-pressure cooling air and adversely affect the operating efficiency and durability of the machine. A process to locally generate and repair the bond coat and/or EBC is therefore desired.

BRIEF DESCRIPTION

In one aspect, a method for forming a sintered bond coat on a silicon-based substrate is disclosed. The method includes applying a bond coat slurry on the silicon-based substrate, drying the bond coat slurry on the silicon-based substrate to form a dried bond coat, and sintering the dried bond coat in an oxidizing atmosphere to form a sintered bond coat on the silicon-based substrate. The bond coat slurry includes a bond coat patching material in a bond coat fluid carrier. The bond coat patching material includes a silicon-based powder, a bond coat binder, and a bond coat sintering aid. The silicon-based powder has a plurality of small particles with median particle size less than 1 micron.

In another aspect, an article is disclosed. The article includes a silicon-based substrate, a sintered bond coat formed on the silicon-based substrate, and a sintered environmental barrier coating (EBC) formed on the sintered bond coat. The sintered bond coat includes a silicon-based phase and an oxide of the silicon-based phase. The oxide of the silicon-based phase comprises an interconnected network. A porosity of the sintered bond coat is less than 20% by volume.

DRAWINGS

Various features, aspects, and advantages of the present disclosure will become better understood when the following detailed description is read with reference to the accompanying drawings in which like characters represent like parts throughout the drawings. Unless otherwise indicated, the drawings provided herein are meant to illustrate only the key features of the disclosure. These key features are believed to be applicable in a wide variety of systems which comprises one or more embodiments of the invention. As such, the drawings are not meant to include all conventional features known by those of ordinary skill in the art to be required for practicing the invention.

DETAILED DESCRIPTION

Figure 1:
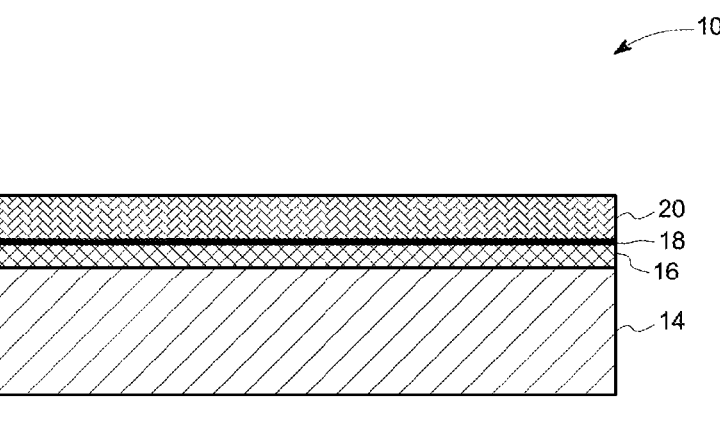
FIG. 1 is a schematic cross-sectional view of an article including a bond coat and an environmental barrier coating (EBC) formed on a silicon-based substrate.

In the following specification and the claims that follow, the singular forms "a," "an," and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term "about" may not be limited to the precise value specified, and may include values that differ from the specified value. A value modified by a term "substantially" can include values that differ to an extent that the intended function is maintained. In at least some instances, the approximating language may correspond to the precision of an instrument for measuring a value.

To more clearly and concisely describe and point out the subject matter, the following definitions are provided for specific terms, which are used throughout the following description and the appended claims, unless specifically denoted otherwise with respect to particular embodiments.

As used herein, the term "silicon-based substrate" is a substrate that includes silicon, a silicon alloy, a compound having silicon and at least one other element, or a combination of silicon alloy and the compound having silicon and the at least one other element. The term "silicon-based powder" refers to a powder comprising silicon as a major constituent. Thus, in the "silicon-based powder," silicon is present in largest atomic concentration among all constituents of the powder formulation. The silicon may be present as silicon metal, a silicon alloy, a metal silicide, or combinations thereof. As used herein in the context of silicon-based powders and silicon-based phase, the terms "silicon" and "silicon-based alloy" refer to their respective unoxidized forms. The term "slurry" as used herein refers to a mixture of at least one solid and at least one liquid. A "bond coat fluid carrier" is a fluid that is mixed with the bond coat patching material to form a bond coat slurry. An "EBC fluid carrier" is a fluid that is mixed with the EBC patching material to form an EBC slurry. The term "bond coat sintering aid" as used herein refers to a material that decreases the sintering temperature of a dried bond coat and/or enhances sintering kinetics of the dried bond coat at a particular sintering temperature. An "oxidizing atmosphere" is an atmosphere that contains sufficient oxygen partial pressure to cause an oxidation reaction, and may include air and combustion gas.

Some embodiments of this disclosure recite a method for forming a sintered bond coat on a silicon-based substrate. The method for forming the sintered bond coat includes applying a bond coat slurry on the silicon-based substrate, drying the bond coat slurry on the silicon-based substrate to form a dried bond coat, and sintering the dried bond coat in an oxidizing atmosphere to form a sintered bond coat on the silicon-based substrate. The bond coat slurry includes a bond coat patching material in a bond coat fluid carrier. The bond coat patching material includes a silicon-based powder, a bond coat binder, and a bond coat sintering aid. The use of silicon-based powder for forming the sintered bond coat results in a silicon-based sintered bond coat. The silicon-based powder includes a plurality of small particles with median particle size less than 1 micron.

FIG. 1 is a cross-sectional view of an article 10 for use with high temperature components, in accordance with one or more aspects of the present disclosure. In some embodiments, the article 10 may be in the form of blades, vanes, combustor liners, or shrouds of gas turbine engines. In the illustrated figure, a silicon-based substrate 14 is provided. The silicon-based substrate 14 may be selected for its high temperature mechanical, physical, and/or chemical properties. The silicon-based substrate 14 may include any silicon-containing material, such as a silicon-containing ceramic (e.g., silicon carbide (SiC), silicon nitride ($Si_3N_4$), silicon oxynitride, silicon aluminum oxynitride), a composite including a SiC or $Si_3N_4$ matrix, a silicon containing metal alloy, or a silicon-containing intermetallic (e.g., molybdenum-silicon alloys, niobium-silicon alloys). In some embodiments, the silicon-based substrate includes a silicon carbide based CMC which includes a silicon carbide containing matrix reinforced with silicon carbide fibers. In another example, the silicon-based substrate 14 may be a silicon-based monolithic ceramic material, for instance SiC, $Si_3N_4$ or a combination of SiC and $Si_3N_4$. In some embodiments, the silicon-based substrate 14 may be fabricated from a material that can withstand combustion environments at operating temperatures greater than 1150° C. for a duration exceeding 20,000 hours. In FIG. 1, a bond coat 16 is present over the silicon-based substrate 14, a silica layer 18 is present over the bond coat 16, and an EBC 20 is present over the silica layer 18.

The bond coat 16 is a chemical barrier, preventing oxidation of the silicon-based substrate 14, forming a protective thermally grown silicon oxide 18, and promoting the adhesion of the EBC 20. In some embodiments, the bond coat 16 includes elemental silicon, a silicon alloy, a metal silicide or combinations thereof. The bond coat may have a thickness in a range from about 25 microns to about 150 microns. In some embodiments, the silica layer 18 may have an initial (as-formed) thickness in a range from about 1 micron to about 10 microns. The thickness of the silica layer 18 may further increase due to the oxidation of the underlying bond coat 16 in use.

The EBC 20, present as a coating in the article 10, may provide a thermal barrier as well as a hermetic seal against the corrosive gases in the hot combustion environment and thus protect the underlying silica layer 18, bond coat 16, and silicon-based substrate 14 from overheating and/or thermochemical attack. By way of example, as described above, the protective coatings present over silicon-based substrate 14 advantageously facilitate inhibition of oxidation, overheating, and/or volatilization of the silicon-based substrate material in a hot combustion environment of a gas turbine engine.

In some embodiments, the EBC 20 may have a thickness in a range from about 25 microns to about 500 microns. In some embodiments, the EBC 20 may comprise one or more rare earth (RE) silicates. As used herein, "a rare earth silicate" refers to a silicate of one or more rare earth elements. In some embodiments, the silicate of the rare earth element may include, but is not limited to, a rare earth monosilicate ($RE_2SiO_5$), a rare earth disilicate ($RE_2Si_2O_7$), or a combination of $RE_2SiO_5$ and $RE_2Si_2O_7$. In some embodiments, the rare earth element in the rare earth silicate may be chosen from yttrium, scandium, and elements of the lanthanide series. By way of example, the RE elements may include yttrium, ytterbium, or lutetium.

The EBC 20 may include one or more layers. Optionally, one or more additional coatings may be located above or below the EBC 20. Such additional coatings may provide additional functions to the article 10, such as further thermal barrier protection, recession resistance, abradable sealing, thermochemical resistance to corrosion, resistance to erosion, resistance to impact damage, and/or resistance to inter-diffusion between adjacent layers. In some embodiments, the EBC 20 and the optional one or more layers may have a coefficient of thermal expansion that is substantially close to a coefficient of thermal expansion of the silicon-based substrate 14. Typically, a mismatch in coefficient of thermal expansion between EBC and the silicon-based substrate is within ±3 parts per million per degree Kelvin.

Figure 2:
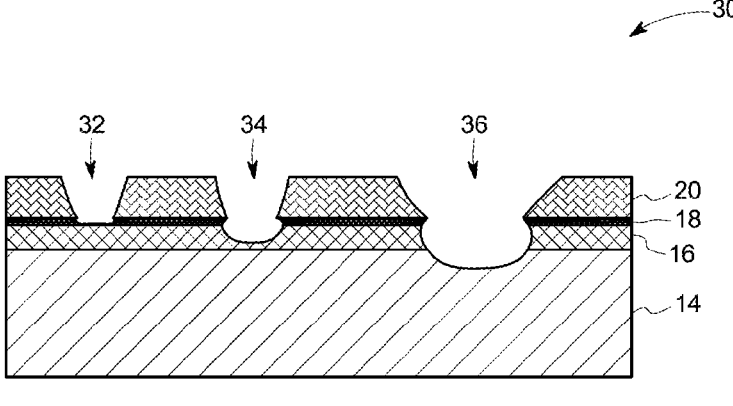
FIG. 2 is a schematic cross-sectional view of an article that is damaged in the surface region at one or more locations, in accordance with some embodiments of the present disclosure.

FIG. 2 is a cross-sectional view of an exemplary damaged article 30, having one or more damaged areas 32, 34, 36 on its surface. Depending on the severity of the damage to the article 30, there may be partial or complete spallation of the EBC 20 and bond coat 16. Material loss may further be accompanied in use by recession in one or more of the silica layer 18, bond coat 16 and silicon-based substrate 14. As illustrated in FIG. 2, material loss confined to the EBC 20 or to a combination of EBC 20 and the silica layer 18 defines the damaged area 32, material loss in the EBC 20 and bond coat 16 defines the damaged area 34, and material loss in the EBC 20, bond coat 16, and silicon-based substrate 14 defines the damaged area 36. If material loss is confined to the EBC 20, as illustrated by damaged area 32, repair may be accomplished by known EBC patch repair methods. Some example methods of repairing the EBC 20 layer by using slurry patch deposition is described in this disclosure.

Some embodiments of this disclosure illustrate methods of repairing the damaged area 34 (confined to EBC 20 and bond coat 16) and/or damaged area 36 (spanning EBC 20, bond coat 16, and silicon-based substrate 14) of the article 30. Currently known methods for applying the bond coat 16 and/or repairing the silicon-based substrate 14 require stringent atmosphere control, high deposition power, large operating volumes and/or high-temperature furnaces. As a result, such methods are generally carried out in a specialized laboratory or factory environment. The methods of the present disclosure are directed to the formation and/or restoration/repair of one or more of the silicon-based substrate 14, bond coat 16, and EBC 20 using one or more slurry deposition processes. As is known in the art, the main challenges in making a silicon-based bond coat via a slurry deposition method are (1) poor densification of the covalently bonded bond coat material and (2) the complexity of sintering in a non-oxidizing atmosphere to prevent oxidation of silicon. This disclosure overcomes the known challenges for forming a silicon-based bond coat. Some embodiments of this disclosure enhance sintering kinetics by modifying the slurry chemistry and carefully controlling various parameters in slurry-based deposition of the bond coat 16. Further aspects of the methods of forming bond coat are described herein disclosing an exemplary embodiment of applying the bond coat slurry over the damaged areas 34, 36 for restoring the bond coat and/or substrate in the damaged areas.

In some embodiments, forming a sintered bond coat includes forming a bond coat slurry and applying it to the damaged area 34 or 36, drying the bond coat slurry to form a dried bond coat, and sintering the dried bond coat in an oxidizing atmosphere. In some embodiments, applying the bond coat slurry to the damaged area includes applying the bond coat slurry to a silicon-based substrate. The bond coat slurry includes a bond coat patching material in a bond coat fluid carrier. In some embodiments, the bond coat slurry consists essentially of the bond coat fluid carrier and the bond coat patching material. The bond coat patching material includes a silicon-based powder, a bond coat binder, and a bond coat sintering aid. In some embodiments, the bond coat patching material consists essentially of the silicon-based powder, the bond coat binder, and the bond coat sintering aid, without having any other material that would affect the functioning of the eventually formed bond coating. Depending on the extent of damage in article 30, the bond coat slurry may be applied on the silicon-based substrate 14 or a remaining part of the bond coat 16. For example, referring to FIG. 2, in the damaged area 36 the bond coat slurry may be deposited over the silicon-based substrate 14, while in the damaged area 34, the bond coat slurry is deposited over the remaining part of the bond coat 16.

As mentioned earlier, the method of forming the sintered bond coat includes applying the bond coat slurry onto the damaged area 34 or 36 of the silicon-based substrate. The bond coat slurry includes a bond coat carrier fluid and a bond coat patching material. The bond coat patching material includes silicon-based powder, a bond coat binder and a bond coat sintering aid. The silicon-based powder comprises silicon, silicon alloy, metal silicide or a combination thereof. In some embodiments, the silicon-based powder may further comprise a group III element, a group V element, or a combination of the group III element and the group IV element. In some embodiments, the silicon-based powder is silicon. In some other embodiments, the silicon-based powder is selected from the group consisting of silicon, a silicon alloy, a metal silicide, or a combination thereof. In some embodiments, the silicon alloy includes boron. In certain embodiments, the silicon alloy is an alloy of silicon and boron. In some embodiments, the silicon alloy may include alloying elements such as germanium, aluminum, nitrogen, phosphorous, iron, or a combination thereof.

The bond coat binder in the bond coat patching material facilitates application of the bond coat slurry to the silicon-based substrate, promotes adhesion of the bond coat slurry to the silicon-based substrate and/or improves the green strength of the bond coat slurry after drying. The bond coat binder may be an inorganic binder or an organic binder. In certain embodiments, the bond coat binder is an organic binder primarily composed of elements that volatilize during heat treatment, such as binder burnout or sintering, such that they are not present in the final bond coat. Non-limiting examples of the bond coat binder include monoethylene glycol, diethylene glycol, triethylene glycol, tetraethylene glycol, glycerol, polyethylene glycol (PEG), dibutyl phthalate, bis(2-ethylhexyl) phthalate, bis(n-butyl) phthalate, butyl benzyl phthalate, diisodecyl phthalate, di-n-octyl phthalate, diisooctyl phthalate, diethyl phthalate, diisobutyl phthalate, di-n-hexyl phthalate, di(propylene glycol) dibenzoate, di(ethylene glycol) dibenzoate, tri(ethylene glycol) dibenzoate, polyvinyl pyrrolidone (PVP), or any combinations thereof. In certain embodiments, the binder is PVP.

In some embodiments, the bond coat binder may be a silicon-based resin material such as, for instance, a cross-linked polyorganosiloxane resin. In some embodiments, the cross-linked polyorganosiloxane resin may be, but is not limited to, a silicone resin. For example, the silicone resin may be DOW Coming®249 flake resin, which includes phenyl and methyl silsesquioxanes and methyl siloxanes.

Various compositions and amounts of bond coat sintering aids may be used. In some embodiments, the bond coat sintering aid may include metallic oxides. Non-limiting examples of metallic oxides that can be used as bond coat sintering aid include iron oxide, gallium oxide, aluminum oxide, nickel oxide, titanium oxide, boron oxide, and alkaline earth oxides. In some embodiments, a bond coat sintering aid may include a metal. Non-limiting examples of metallic bond coat sintering aids include iron, aluminum, boron, and nickel. In certain embodiments, the bond coat sintering aid includes boron. In an exemplary embodiment, the bond coat sintering aid is boron. In some embodiments, boron is used as a bond coat sintering aid during slurry preparation. In some embodiments, the boron may at least partially oxidize and the in-situ prepared boron oxide may also function as the sintering aid. In some embodiments, a bond coat sintering aid may include hydroxides, carbonates, oxalates, or any other salts of the above-mentioned metallic elements. In some embodiments, a median particle size of the bond coat sintering aid used herein is less than 100 nanometers.

In some embodiments, the bond coat fluid carrier may partially or fully dissolve the bond coat binder, the bond coat sintering aid, or a combination thereof. The bond coat fluid carrier may be organic or aqueous. Non-limiting examples of suitable organic solvents that can be employed as bond coat fluid carrier include methanol, ethanol, propanol, butanol, pentanol, hexanol, heptanol, octanol, nonanol, decanol, dodecanol, diacetyl alcohol, acetone, methyl isobutyl ketone (MIBK), methyl ethyl ketone (MEK), toluene, heptane, xylene, ether, or combinations thereof. In certain embodiments, the bond coat fluid carrier includes diacetyl alcohol. The bond coat fluid carrier may further include an additional solvent which, in some embodiments, facilitates dissolving of a silicon-based binder. In a non-limiting example, silicone is used as the bond coat binder in a pentanone fluid carrier, where pentanone dissolves the silicone. In some embodiments, the bond coat fluid carrier may include a particular combination of two or more liquids.

The strength, density, degree of oxidation, and hermeticity of a sintered bond coat in the damaged area 34, 36 may depend on the slurry characteristics and/or processing methods. For example, slurry characteristics can include relative amount of the bond coat patching material and the bond coat fluid carrier in the bond coat slurry, particle size distribution of the bond coat patching material, the type of bond coat binder, the amount of the bond coat binder, the type of bond coat sintering aids, the amount of the bond coat sintering aids, or any combination thereof. These properties may further vary depending on the processing methods, such as, for example, the methods used for applying the bond coat slurry, drying the bond coat, and/or sintering the dried bond coat.

Relative amounts of bond coat patching material and the bond coat fluid carrier in the bond coat slurry may affect the consistency and viscosity of the bond coat slurry, as well as the porosity, adhesion and/or strength of the dried bond coat and the sintered bond coat. In some embodiments, the bond coat slurry includes the bond coat patching material in an amount from about 25 volume % to about 70 volume %. The bond coat fluid carrier may thus be present in an amount from about 30 volume % to about 75 volume % of the bond coat slurry. In some embodiments, the bond coat slurry includes the bond coat patching material in an amount from about 25 volume % to about 60 volume % and the bond coat fluid carrier in an amount from about 40 volume % to about 75 volume %. In certain embodiments, the bond coat slurry includes the bond coat patching material in an amount from about 40 volume % to about 60 volume % and the bond coat fluid carrier in an amount from about 40 volume % to about 60 volume %. In some embodiments, depending on the solubility of the bond coat binder and /or the bond coat sintering aid in the bond coat fluid carrier, the volume percentage of the bond coat patching material in the bond coat slurry may represent the volume percentage of (a) the silicon-based powder, the bond coat binder and the bond coat sintering aid; (b) the silicon-based powder and the bond coat sintering aid; (c) the silicon-based powder and the bond coat binder; or (d) only the silicon-based powder.

In some embodiments, the bond coat patching material includes the bond coat binder in an amount from about 2.5 weight % to about 8 weight % of the bond coat patching material. In certain embodiments, the bond coat patching material includes the bond coat binder in an amount from about 4 weight % to about 6 weight % of the bond coat patching material. In some embodiments, the bond coat patching material includes the bond coat sintering aid in an amount from about 0.5 weight % to about 4.5 weight % of the bond coat patching material. In certain embodiments, the bond coat patching material includes the bond coat sintering aid in an amount from about 1 weight % to about 3 weight % of the bond coat patching material.

Particle size distribution of the silicon-based powder used in the bond coat patching material may be important in determining the mechanical integrity, porosity, and processability of the disposed coating. In some embodiments, the silicon-based powder includes a plurality of small particles with median particle size less than 1 micron. The median particle size of powders is measured as mass median diameter. The mass median diameter may be measured using various methods, such as, for example, using laser scattering. In some embodiments, the silicon-based powder includes greater than 90 volume % of small particles with median particle size less than 1 micron. A known challenge in using a slurry having predominately small-sized particles for making a coating is the occurrence of excessive sintering shrinkage and subsequent cracking. However, in some embodiments of the slurry-based coating methods described herein, slurries having predominantly smaller particles, such as those with median particle size less than 1 micron, are effectively used for bond coat formation/repair without substantial shrinkage of the resultant bond coat. This is achieved at least in part by sintering the dried slurry in an oxidizing environment thereby substantially matching a resultant shrinkage of the silicon and/or silicon alloy or metal silicide during sintering with the resultant expansion of silicon and/or silicon alloy and/or metal silicide by oxidation. Sintering in an oxidizing atmosphere helps to enable this balance of shrinkage and expansion. In some embodiments, the silicon-based powder having greater than 90 volume % of small particles is effectively used to form a bond coat having a thickness up to 150 microns without crack formation upon sintering.

An example method of forming a sintered bond coat includes forming a bond coat slurry, applying the bond coat slurry on a silicon-based substrate, drying the bond coat slurry to form a dried bond coat, and sintering the dried bond coat in an oxidizing atmosphere. The bond coat slurry includes a bond coat patching material in a bond coat fluid carrier. The bond coat patching material includes a silicon-based powder, a bond coat binder, and a bond coat sintering aid. The silicon-based powder includes at least one of silicon, a silicon alloy, a metal silicide. Further, the silicon-based powder has a plurality of small particles with median particle size less than 1 micron.

In some embodiments, the silicon-based powder is present in the form of a plurality of particles having a multimodal distribution. Multimodal distribution of particles improves packing density by filling voids created by larger particles with finer particles. Larger particles provide a shrinkage-resistant backbone to the coating while finer particles promote sintering and bonding to adjacent particles and the silicon-based substrate. Multimodal distribution of the particles in the coating thus helps minimize shrinkage (during drying and/or sintering), mitigating cracking and delamination during densification of thick coatings.

In some embodiments, the silicon-based powder used for forming the bond coat patching material includes a bimodal distribution of particles. The silicon-based powder having a bimodal distribution of particles may include small and medium particles or small and large particles. In some embodiments, the silicon-based powder used for forming the bond coat patching material includes a trimodal distribution of particles that includes a distribution of large, medium, and small particles. Appropriate selection and control of size and volume fractions of the large, medium, and small particles of the silicon-based powder may aid in providing the bond coats with the desired properties for a particular application.

In some embodiments, the silicon-based powder includes a plurality of small particles with median particle size less than 1 micron and further includes a plurality of medium particles with median particle size in a range from 1 micron to 6 microns and a plurality of large particles with median particle size greater than 6 microns. In some embodiments, the plurality of small particles may have a median particle size in a range from about 0.2 microns to 0.95 micron. In some embodiments, the plurality of large particles may have a median size greater than 10 microns. In some embodiments, the plurality of large particles may have a median size in a range from about 10 microns to about 80 microns.

In some embodiments, the plurality of small particles is present in the silicon-based powders in an amount in a range from about 40 volume % to about 90 volume %, the plurality of medium particles is present in an amount in a range from about 5 volume % to about 50 volume %, and the plurality of large particles is present in an amount in a range from about 5 volume % to about 50 volume % of the volume of the silicon-based powders. In certain embodiments, the plurality of small particles is present in an amount in a range from about 60 volume % to about 80 volume %, the plurality of medium particles is present in an amount in a range from about 10 volume % to about 30 volume %, and the plurality of large particles is present in an amount in a range from about 10 volume % to about 30 volume % of the volume of the silicon-based powders.

A general process for preparing the bond coat slurry includes mixing the silicon-based powder, the bond coat binder, and the bond coat sintering aid with the bond coat fluid carrier. The bond coat slurry may be formed using conventional techniques of mixing known to those skilled in the art, such as shaking, ball milling, attritor milling, or mechanical mixing. Ultrasonic energy may be simultaneously used along with the above-mentioned mixing methods to help break apart any agglomerated particles that may be present in the bond coat slurry.

In some embodiments, the bond coat slurry may be disposed on damaged area 34, 36 of the damaged article 30 to make a bond coat slurry patch using any conventional slurry deposition method known to those skilled in the art, including but not limited to, dipping the component into a slurry bath, painting, rolling, stamping, spraying, syringe-dispensing, extruding, spackling or pouring the slurry onto the damaged area 34, 36 of the silicon-based substrate. In some embodiments, undamaged areas of the EBC 20 and/or bond coat 16 may be masked to prevent deposition of the bond coat slurry onto the undamaged areas. The bond coat slurry may optionally be mechanically agitated before disposing on the silicon-based substrate by any method known to those skilled in the art to affect adequate dispersion of the silicon-based powder, the bond coat binder, and the bond coat sintering aid in the dried bond coat formed after drying the bond coat slurry.

Figure 3:
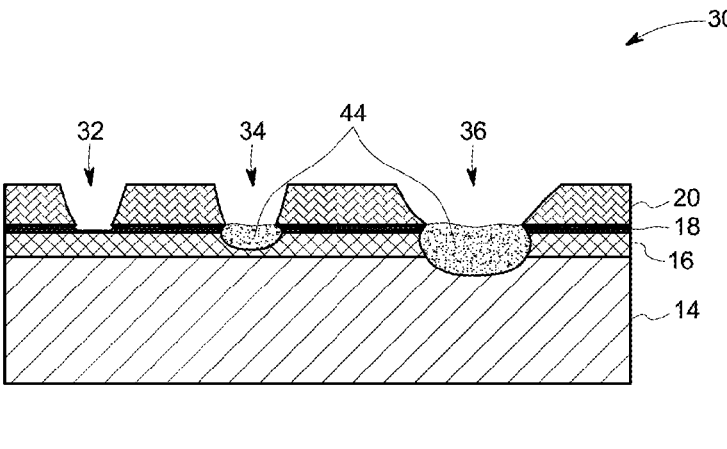
FIG. 3 is a schematic cross-sectional view of an article having a dried bond coat in one or more damaged locations, in accordance with some embodiments of the present disclosure.

In some embodiments, drying of the bond coat slurry occurs under ambient conditions through evaporation of the solvent. In some other embodiments, drying of the bond coat slurry is carried out as a separate step. In some embodiments, drying is carried out during any further heat-treatment of the bond coat slurry such as, for example, binder burnout or sintering. FIG. 3 illustrates the damaged article 30 having a dried bond coat patch 44 disposed in the damaged areas 34, 36 of the article.

The thickness of the dried bond coat may be controlled either during the step of disposing the bond coat slurry or by removing excess slurry material after deposition. In some embodiments, the thickness of the dried bond coat may be in a range from about 30 microns to about 300 microns.

The dried bond coat is subsequently sintered to form the sintered bond coat on the silicon-based substrate. In some embodiments, the sintering is carried out by heat treatment in an oxidizing atmosphere at a temperature greater than 950° C. In some embodiments, the sintering may be carried out by operating the turbine, thereby making the surrounding temperature high enough to sinter the dried bond coat. In some embodiments, the sintering includes heat-treating at a temperature between about 1000° C. and 1400° C. In certain embodiments, the method includes sintering at a temperature greater than 1150° C. and less than 1375° C. for a duration in a range from about 2 hours to about 48 hours. In some embodiments, the dried bond coat 44 may be subjected to an optional binder removal step before the above-mentioned sintering step. Binder removal may be carried out by a slow and/or step-wise heating of the dried bond coat to a temperature less than 800° C. in an oxidizing atmosphere such as air. A slow and/or step-wise heating of the dried bond coat 44 helps to dissociate any bound fluid carrier and to burn out the binder.

The binder removal and sintering steps may be effected in a separate heat-treatment step or during the operation of the article 10. The binder removal and sintering steps may be effected using a conventional furnace or by using methods such as, for example, microwave, laser, combustion torch, plasma torch, and infrared heating. In some embodiments, sintering may be accomplished by heat-treating the dried bond coat 44 at a rate from about 1° C./min to about 500° C./min to a temperature in a range from greater than 1150° C. and less than 1400° C., and holding at that temperature for up to about 48 hours. In another embodiment, sintering may be accomplished by heat-treating the dried bond coat 44 at a rate from about 5° C./min to about 10° C./min to a temperature in a range from greater than 1200° C. to less than 1375° C. and holding at that temperature for up to about 48 hours. In some other embodiments, sintering may be carried out by placing the silicon-based substrate having the dried bond coat patch in a furnace pre-heated to a temperature in a range from greater than 1150° C. to less than 1400° C. and holding at that temperature for up to 48 hours.

In some embodiments, especially during in situ repair of the article 10, the drying of the bond coat slurry patch and sintering of the dried bond coat patch may be achieved in situ. For example, the patch formed by the bond coat slurry may be dried at the ambient temperatures before high temperature operation of article 10 and sintered during the high temperature operation of the article 10.

Sintering facilitates removal of pores from the bond coat and strengthens the bond coat. Sintering also decreases interconnected porosity, thereby forming a substantially hermetic sintered bond coat. A substantially hermetic sintered bond coat prevents in-service oxidation of the silicon-based substrate 14 by eliminating fluid communication between the oxidizing atmosphere (comprising, for example, oxygen and/or water vapor) and the silicon-based substrate 14.

The sintering step is carried out in an oxidizing atmosphere. The oxidizing atmosphere includes ambient air. In some embodiments, a partial pressure of the oxygen in the oxidizing atmosphere is less than 0.2 atm. In other embodiments, the oxidizing atmosphere includes combustion gases that may be present around the article 30 while sintering.

It is recognized that silicon powders will oxidize during heat treatment in an oxidizing atmosphere. Hence, in conventional methods, a silicon-containing-bond coat is heattreated in inert or reducing atmosphere to avoid oxidization of the silicon. In contrast, in the embodiments presented herein, the sintering step is carried out in an oxidizing atmosphere. The dried bond coat 44 is sintered to form a sintered bond coat that, while partially oxidized, still protects the silicon-based substrate through its high density and remaining unoxidized silicon-based portion. Thus, the oxidation of the silicon-based dried bond coat 44 is controlled to form a dense sintered bond coat. The dense sintered bond coat minimizes continuous pore channels connecting the silicon-based substrate 14 to the oxidizing species in the surrounding operating atmosphere. The sintered bond coat may comprise an interconnected network of the oxides of the silicon-based powder.

This controlled oxidation of the silicon-based powder is achieved by a careful balance between the controlled particle size distribution disclosed above presence and amount of a suitable bond coat binder, and presence and amount of a suitable bond coat sintering aid. In certain embodiments, two or more of the above parameters are controlled such that a shrinkage of the dried bond coat 44 during sintering is substantially matched to the volume expansion of the dried bond coat 44 as a result of oxidation. This matching of the sintering shrinkage and oxidation swelling results in a decrease in the net volume change of the dried bond coat 44 during sintering and helps prevents cracking and delamination. In some embodiments, a volume of the sintered bond coat formed by the methods disclosed herein is greater than 90% of the volume of the dried bond coat 44. In some embodiments, the volume of the sintered bond coat is greater than 95% of the volume of the dried bond coat 44. In some embodiments, the volume of the sintered bond coat is in a range from about 90% to about 110% of the dried bond coat 44.

In some embodiments, the method for forming the sintered bond coat is controlled such that simultaneous sintering and oxidation of the silicon-based powder result in controlled amounts of silicon-based phases and oxides of the silicon-based phase in the formed sintered bond coat. In some embodiments, an amount of the oxides of the silicon-based phase in the sintered bond coat is in a range from about 25 volume % to about 55 volume %. In certain embodiments, the amount of the oxides of the silicon-based phase in the sintered bond coat is in a range from about 30 volume % to about 50 volume %. In some embodiments, the amount of the oxides of the silicon-based phase in the sintered bond coat is in a range from about 30 volume % to about 45 volume %. In some embodiments, the sintered bond coat 16 has a thickness in the range from about 20 microns to about 250 microns. In some embodiments, the bond coat 16 has a thickness in the range from about 25 microns to about 150 microns.

In some embodiments, the method further includes forming a sintered EBC on the sintered bond coat. Referring to FIG. 3, an EBC slurry may be applied on the damaged area 32, the dried bond coat patch 44 formed in the damaged areas 34, 36, or the sintered bond coat patch formed in the damaged areas 34, 36, or any combinations thereof. In some embodiments, the EBC slurry is applied over the dried bond coat patch 44 disposed in the damaged areas 34, 36. The EBC slurry may be applied over the dried bond coat patch 44 in the damaged areas 34, 36, before sintering the dried bond coat patch 44. Methods of applying EBC slurry and restoring the EBC 20 in other method steps such as, for example, on the sintered bond coat patch, are also part of this disclosure.

In some embodiments, the method includes applying an EBC slurry on the dried bond coat patch 44, drying the EBC slurry on the dried bond coat to form a dried EBC, and sintering the dried bond coat and the dried EBC together in an oxidizing atmosphere to form a sintered bond coat on the silicon-based substrate and a sintered EBC on the sintered bond coat. The EBC slurry includes an EBC patching material in an EBC fluid carrier. The EBC patching material comprises an EBC powder and an EBC binder.

In some embodiments, a primary constituent of the EBC powder is silicon. The EBC powder may include one or more rare earth (RE) elements along with silicon. A molar ratio of the RE element to silicon may be in a range from about 0.9 to about 2.5. In some embodiments, the molar ratio of the RE element to silicon is in a range from about 0.95 to about 1.25. In some embodiments, the EBC powder includes a rare earth monosilicate ($RE_2SiO_5$), a rare earth disilicate ($RE_2Si_2O_7$), or a combination of $RE_2SiO_5$ and $RE_2Si_2O_7$. In some embodiments, the rare earth element of the at least one of the rare earth monosilicate or the rare earth disilicate includes at least one of ytterbium or yttrium. In some embodiments, the EBC powder includes a precursor of the rare earth monosilicate, a precursor of the rare earth disilicate, or a combination thereof An "EBC binder" is a binder used as a part of the EBC slurry. Addition of the EBC binder may facilitate adhesion of the EBC patching material to the existing or dried bond coat 44 as well as existing EBC 20 and improve green strength of the EBC patching material. The EBC binder may be an inorganic binder or an organic binder. In some embodiments, the EBC binder is similar in composition to the bond coat binder used in the underlying dried bond coat 44. In some other embodiments, the EBC binder is different in composition from the bond coat binder used in the underlying dried bond coat 44. Non-limiting examples of the EBC binder include all those materials that are previously disclosed as bond coat binders.

In some embodiments, the EBC patching material may further include an EBC sintering aid. Various sintering aids described as "bond coat sintering aids" in this disclosure may also be used as EBC sintering aids. In certain embodiments, the EBC sintering aid is different from the bond coat sintering aid used in the underlying dried bond coat 44.

In some embodiments, the EBC fluid carrier may partially or fully dissolve the EBC binder, the EBC sintering aid, or a combination thereof. The EBC fluid carrier may be organic or aqueous. In some embodiments, the EBC fluid carrier is the same as the bond coat fluid carrier used in the underlying dried bond coat 44. Non-limiting examples of EBC fluid carrier include the materials that are previously disclosed as bond coat fluid carriers.

The strength, density, and/or hermeticity of the sintered EBC in the damaged area 32, 34, 36 may depend on one or more of the relative amount of the EBC patching material and EBC fluid carrier used in the EBC slurry, particle size distribution of the EBC patching material, relative amount of the EBC binder present in the EBC patching material, the presence and amounts of EBC sintering aids, and the processing methods used for applying the EBC slurry, drying the EBC, and sintering the dried EBC, among many other aspects.

Parameters such as, for example, relative amounts of EBC patching material and EBC fluid carrier in the EBC slurry, EBC powder composition, presence, composition and amounts of EBC binder and EBC sintering aid, and particle size distributions of the EBC powder may affect the consistency and viscosity of the EBC slurry as well as the porosity and strength of the sintered EBC. In some embodiments, the EBC slurry includes the EBC patching material in an amount from about 25 volume % to about 70 volume % of the EBC slurry. In some embodiments, the EBC patching material includes the EBC binder in an amount from about 2 weight % to about 8 weight % of the EBC patching material. In some embodiments, the EBC patching material includes the EBC sintering aid in an amount from about 0.5 weight % to about 5 weight % of the EBC patching material. In some embodiments, the EBC powder includes a plurality of small particles with median particle size less than 1 micron. In some embodiments, the EBC powder includes greater than 10 volume % of small particles with median particle size less than 1 micron.

In some embodiments, the EBC powder is present in the form of a plurality of particles having a multimodal distribution. In some embodiments, the EBC powder used for forming the EBC slurry includes a trimodal distribution of particles. In certain embodiments, the EBC powder includes a plurality of small particles with median particle size less than 1 micron and further includes a plurality of medium particles with median particle size in a range from 1 micron to 6 microns and a plurality of large particles with median particle size greater than 6 microns. In some embodiments, the plurality of small particles may have a median particle size in a range from about 0.2 microns to 0.95 microns. In some embodiments, plurality of large particles may have a median particle size greater than 10 microns. In some embodiments, the plurality of large particles may have a median particle size in a range from about 10 microns to about 60 microns.

Figure 4:
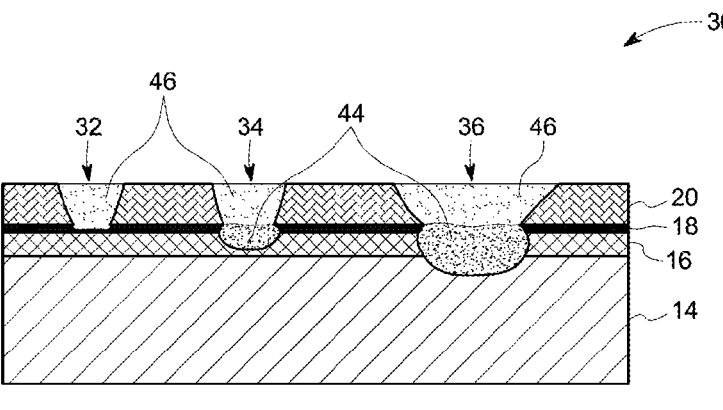
FIG. 4 is a schematic cross-sectional view of an article having a dried bond coat and a dried EBC overlying the dried bond coat in one or more damaged locations, in accordance with some embodiments of the present disclosure.

A general process for preparing the EBC slurry includes mixing the EBC fluid carrier, the EBC powder, the EBC binder, and the EBC sintering aid (if present). The EBC slurry may be disposed on the dried bond coat and dried to form a dried EBC 46, as shown in FIG. 4. In some embodiments, drying of the EBC slurry occurs under ambient conditions through evaporation of the solvent. In other embodiments, drying of the EBC slurry is carried out as a separate step. In yet other embodiments, drying is carried out as part of further heat-treatments, such as binder burn out and/or sintering of the EBC slurry. In some embodiments, the dried EBC 46 may be pre-sintered at a temperature that is less than the final sintering temperature and infiltrated with a secondary slurry to further densify the dried EBC 46. The secondary slurry may include the EBC powder, rare earth oxide powder, silica, precursors of the EBC, silica and rare earth oxide, or a combination thereof.

The thickness of the dried EBC 46 may be controlled either during the step of disposing the EBC slurry or by removing excess material after deposition and prior to or after drying. In some embodiments, the thickness of the dried EBC 46 may be in a range from about 50 microns to about 1000 microns. In some embodiments, the thickness of the dried EBC 46 may be in a range from about 100 microns to about 800 microns.

In some embodiments, the dried EBC 46 along with the underlying dried bond coat patch 44 in damaged areas 34, 36 is sintered at high temperatures (e.g., greater than 900° C.) to form the sintered bond coat and the sintered EBC on the sintered bond coat. If the dried EBC 46 is also present on the damaged area 32, sintering of the dried EBC 46 on the damaged area 32 may be carried out along with sintering the dried bond coat 44 and the dried EBC in the damaged areas 34, 36.

In some embodiments, the sintering is carried out by operating the turbine. In some embodiments, the sintering may be carried out by heat treatment at a temperature greater than 950° C. In some embodiments, the sintering includes heat treating at a temperature between about 1000° C. and 1400° C. In certain embodiments, the method includes sintering a combination of dried bond coat 44 and the dried EBC 46 at a temperature greater than 1150° C. and less than 1375° C. for a duration in a range from about 2 hours to about 48 hours. In some embodiments, the dried bond coat 44 and the dried EBC 46 may be subjected to optional binder removal steps before the sintering step. The binder removal and sintering steps may be effected in a separate heat-treatment step or during the operation of the article 10. Binder removal may be carried out by a slow and/or step-wise heating to a temperature less than 800° C. in an oxidizing atmosphere, such as air. A slow or step-wise heating of the combination of the dried bond coat 44 and dried EBC 46 helps to dissociate any fluid carrier and to burn out the binder. The binder removal and sintering steps may be effected using a conventional furnace or by using such methods as, for example, microwave, laser, combustion torch, plasma torch or infrared heating. In some embodiments, sintering may be accomplished by heat treating the combination of the dried bond coat 44 and dried EBC 46 at a rate from about 1° C./min to about 500° C./min to a temperature in a range from greater than 1150° C. and less than 1400° C., and holding the coating at that temperature for up to about 48 hours. In another embodiment, sintering may be accomplished by heat-treating the combination of the dried bond coat 44 and dried EBC 46 at a rate from about 5° C./min to about 20° C./min to a temperature in a range from greater than 1200° C. to less than 1375° C. and holding the coating at that temperature for up to about 48 hours. In some other embodiments, rapid sintering may be effected by placing the dried coating in a furnace that is pre-heated to a temperature in a range from greater than 1200° C. to less than 1400° C. and holding the coating at that temperature for up to about 48 hours.

Figure 5:
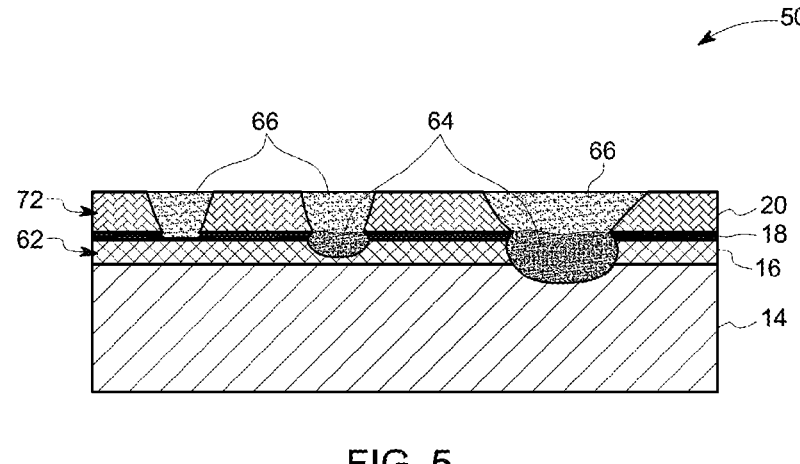
FIG. 5 is a schematic cross-sectional view of an article having a sintered bond coat and a sintered EBC in one or more damaged locations, in accordance with some embodiments of the present disclosure.

Sintering facilitates removal of pores in the EBC or a combination of bond coat and EBC and helps strengthen the coatings. Furthermore, sintering decreases the interconnected porosity and helps to form a substantially hermetic bond coat and/or EBC. In some embodiments, a sintered EBC is formed on the sintered bond coat on the silicon-based substrate, as shown in FIG. 5. A combination of sintered bond coat 64 and sintered EBC 66 may prevent a continuous path for water vapor and/or oxygen from the operating atmosphere to the silicon-based substrate 14 in an operating condition of the article 50. The sintering step may be carried out in an oxidizing atmosphere.

In some embodiments, a method of forming a sintered bond coat and a sintered EBC on the sintered bond coat is disclosed. The method includes forming a bond coat slurry, forming an EBC slurry, applying the bond coat slurry on a silicon-based substrate, drying the bond coat slurry to form a dried bond coat, applying the EBC slurry on the dried bond coat, drying the EBC slurry to form a dried EBC, and sintering the dried bond coat and the dried EBC simultaneously in an oxidizing atmosphere. The bond coat slurry includes a bond coat patching material in a bond coat fluid carrier. The bond coat patching material includes a silicon-based powder, a bond coat binder, and a bond coat sintering aid. The silicon-based powder includes silicon, a silicon alloy, a metal silicide or a combination thereof. The EBC slurry includes an EBC patching material in an EBC fluid carrier. The EBC patching material includes an EBC powder, an EBC binder, and an EBC sintering aid.

In some embodiments, an article that includes a silicon-based substrate, a sintered bond coat formed on the silicon-based substrate, and a sintered EBC formed on the sintered bond coat is disclosed. The sintered bond coat includes a silicon-based phase and an oxide of the silicon-based phase. The oxide of the silicon-based phase includes an interconnected network. A porosity of the sintered bond coat is less than 20% by volume.

The article may be formed using one or more methods disclosed hereinabove. In some embodiments, the article is a new component having the sintered bond coat and the sintered EBC formed by any one of the slurry deposition techniques disclosed above. In some embodiments, the article includes a repaired portion having the sintered bond coat. In some embodiments, the article includes a repaired portion that has a sintered bond coat and sintered EBC formed by one or more methods disclosed above. In some embodiments, the article includes a repaired portion having the sintered EBC. For example, the article 50 in FIG. 5 illustrates the bond coat 16 having two portions. A first portion 62 represents a portion of the pre-existing bond coat 16 and a second, repaired portion 64 represents the sintered bond coat. The EBC 20 includes two portions. A first part 72 represents a portion of the pre-existing EBC 20, and a second, repaired portion 66 represents the sintered EBC.

The sintered bond coat 64 and the sintered EBC 66 are formed by any one of the slurry deposition methods described above. In certain embodiments, repaired portions 64 and 66 of the article 50 are constructed by applying the bond coat slurry on the silicon-based substrate 14, drying the bond coat slurry to form a dried bond coat, applying the EBC slurry on the dried bond coat, drying the EBC slurry to form a dried EBC, and sintering the dried bond coat and the dried EBC simultaneously in an oxidizing atmosphere.

The silicon-based phase and the oxide of the silicon-based phase of the sintered bond coat 64 are formed from the silicon-based powders of the bond coat slurry used in the slurry deposition of the bond coat. The silicon-based powders of the slurry yield the silicon-based phase and the oxide of the silicon-based phase during the sintering of the dried bond coat in an oxidizing atmosphere. The silicon-based phase comprises silicon, a silicon alloy, a metal silicide or a combination thereof. In some embodiments, the silicon-based phase comprises a group III element, a group V element, or a combination of the group III element and the group IV element. In some embodiments, the silicon-based phase is substantially elemental silicon. In some embodiments, the silicon-based phase is selected from the group consisting of silicon, a silicon alloy, a metal silicide and combinations thereof. In some embodiments, the oxide of the silicon-based phase includes silicon oxide. In some embodiments, the oxide of the silicon-based phase includes an oxide of silicon and the alloying element.

In some embodiments, the sintered bond coat includes the silicon-based phase in an amount greater than 40 volume %. In certain embodiments, the sintered bond coat 64 has less than 75 volume % of the silicon-based phase. The remaining volume percentage of the sintered bond coat 64 may comprise the oxide of the silicon-based phase. In some embodiments, the amount of the silicon-based phase in the sintered bond coat 64 is in a range from about 50 volume % to about 70 volume % of the sintered bond coat 64.

In some embodiments, the sintered bond coat 64 includes a microstructure having substantially equiaxed silicon-based phase surrounded by oxide of the silicon-based phase. The substantially equiaxed silicon-based phase is formed by the sintering of the silicon-based powder. The surrounding oxide of the silicon-based phase is formed by the partial oxidation of the silicon-based phase during sintering in oxidizing atmosphere. This microstructure of substantially equiaxed silicon-based phase surrounded by the oxide of the silicon-based phase is distinct from the microstructure obtained by oxidation of the splats of bond coat formed by air plasma spray (APS) method and any resultant oxide formation associated with the splat boundaries. The splats formed by the APS method have substantially flattened shape and any oxide phase is generally present at the inter-splat boundaries and in intra-splat microcracks. Similarly, this microstructure of substantially equiaxed silicon-based phase surrounded by the oxide of the silicon-based phase is distinct from the microstructure obtained by CVD processing of the bond coat, which is substantially devoid of oxide.

The sintered bond coat 64 of the article includes an interconnected network of the oxide of the silicon-based phase. In some embodiments, the interconnected network of oxide of the silicon-based phase in the sintered bond coat connects the silicon-based substrate 14 and the sintered EBC.

Porosity of the sintered bond coat 64 is less than 20% by volume. In some embodiments, the porosity of the sintered bond coat 64 is less than 10% by volume. In certain embodiments, the porosity of the sintered bond coat 64 is less than 5% by volume. In some embodiments, interconnected porosity in the sintered bond coat 64 that allows fluid communication between the silicon-based substrate 14 and the operating atmosphere is less than 0.1% by volume. In some embodiments, the porosity of the sintered EBC 66 is less than 30% by volume. In some embodiments, the porosity of the sintered EBC 66 is less than 10% by volume. In some embodiments, a porosity in the sintered EBC 66 that allows fluid communication between the bond coat 16 and the operating atmosphere is less than 0.1% by volume.

In some embodiments, the sintered bond coat 64 is substantially hermetic, thus preventing fluid communication between the atmosphere and the silicon-based substrate. In some embodiments, the substantially hermetic sintered bond coat 64 may have a gas permeability below about $2\times10^{-14}$ $cm^2$ (about $2\times10^{-6}$ Darcy), the detection limit of commonly used measurement techniques.

In some embodiments, the sintered bond coat 64 has a thickness in a range from about 20 microns to about 250 microns. In some embodiments, the sintered bond coat 64 has a thickness in a range from about 25 microns to about 150 microns. In some embodiments, the sintered EBC 66 has a thickness in a range from about 25 microns to about 600 microns. In some embodiments, the sintered EBC 66 has a thickness in a range from about 50 microns to about 500 microns. The sintered EBC 66 may include any of the earlier disclosed rare earth silicates.

In some embodiments, the article including the sintered bond coat 64 and sintered EBC 66 may be a turbine engine component that is subjected to high temperatures, such as, for example, a blade, a vane, a combustor liner or a shroud. Further, such components may be incorporated into systems including, without limitation, other components that are subjected to extreme thermal and/or chemical conditions during operation.

EXAMPLE

The following example illustrates methods, materials, and results, in accordance with specific embodiments, and as such should not be construed as imposing limitations upon the claims. All components are commercially available from common chemical suppliers.

Silicon powders having a median particle size of less than 100 nanometers (small particles) were used as the silicon-based bond coat powder. Polyvinyl Pyrrolidone (PVP40) and boron powder having particle size less than 1 micron were used as binder and sintering aid, respectively. Patching material consisting of Si powder with 6 wt % PVP40 binder and 1.5 wt % boron sintering aid was prepared by mixing in an agate mortar and pestle. A 15 gram batch of slurry was made by mixing the above-mentioned bond coat patching material in pentanone fluid carrier, such that the patching material was 52 volume % of the slurry.

Ytterbium disilicate (YbDS) from Praxair having a median particle size of about 1 micron was used as the EBC powder. PVP40 was used as binder while $Al_2O_3$ and $Fe_2O_3$ (having particle sizes of 100 nm and 50 nm, respectively and added in a molar ratio of 1:1.6) were used as sintering aids. A 30 gram batch of EBC patching material was prepared by adding 4 wt % binder and 1.4 wt % sintering aid to the EBC powder. EBC slurry was made by mixing above mentioned EBC patching material in pentanone, maintaining a patching material loading of about 32 volume %.

First, approximately 50 microns of the bond coat slurry was applied to the surface of a SiC coupon using a spatula. After drying in an air oven at 100° C. for 60 minutes, an EBC slurry was applied over the dried bond coat by slurry spraying. The SiC coupon with dried bond coat and EBC top coat was dried at 100° C. for 30 minutes. EBC coating by slurry spray technique was repeated—twice to build the thickness of EBC to about –150 microns. The SiC coupon with dried bond coat and dried EBC top coat was sintered for 6 hours at 1345° C. in air using a heating rate of 5° C./min, followed by furnace cooling to room temperature. Cross sectional microstructure of the sintered coupon indicated excellent adhesion between the SiC substrate and the bond coat, as well as between the bond coat and the YbDS EBC. Energy-dispersive spectroscopy suggests partial oxidation of the silicon bond coat, with an average composition of about 60 atomic % Si and about 40 atomic % oxygen. This data suggests a molar concentration of about 33% $SiO_2$ and 67% Si.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method comprising:
applying a bond coat slurry on a silicon-based substrate, wherein the bond coat slurry comprises:
a bond coat patching material in a bond coat fluid carrier, wherein the bond coat patching material comprises a silicon-based powder,
a bond coat binder, and
a bond coat sintering aid, wherein the bond coat sintering aid is boron;

wherein the silicon-based powder comprises a plurality of small particles with a median particle size less than 1 micron, a plurality of medium particles with median particle size in a range from 1 micron to 6 microns, and a plurality of large particles with median particle size greater than 6 microns, and wherein the plurality of small particles is present in an amount in a range from about 60 volume % to about 80 volume %, the plurality of medium particles is present in an amount in a range from about 10 volume % to about 30 volume %, and the plurality of large particles is present in an amount in a range from about 10 volume % to about 30 volume % of the volume of the silicon-based powder;
drying the bond coat slurry on the silicon-based substrate to form a dried bond coat; and
sintering the silicon-based powder in the dried bond coat in an oxidizing atmosphere to form a sintered bond coat on the silicon-based substrate, wherein the sintered bond coat comprises a silicon-based phase and an oxide of the silicon-based phase, and the silicon-based phase comprises silicon, a silicon alloy, a metal silicide, or a combination thereof, wherein the oxide of the silicon-based phase in the sintered bond coat is present in an amount in a range of 25 volume % to 55 volume %.

2. The method of claim 1, wherein the silicon-based powder comprises silicon, a silicon alloy, a metal silicide or a combination thereof.

3. The method of claim 1, wherein the bond coat slurry comprises the bond coat patching material in an amount from about 25 volume % to about 70 volume % of the bond coat slurry.

4. The method of claim 1, wherein the bond coat patching material comprises the bond coat binder in an amount from about 2.5 weight % to about 8 weight % of the bond coat patching material.

5. The method of claim 1, wherein the bond coat patching material comprises the bond coat sintering aid in an amount from about 0.5 weight % to about 4.5 weight % of the bond coat patching material.

6. The method of claim 1, wherein the silicon-based substrate comprises a silicon carbide-based ceramic matrix composite.

7. The method of claim 1, wherein the sintering of the dried bond coat comprises heat-treating the dried bond coat at a temperature between about 1000° C. and about 1400° C.

8. The method of claim 1, wherein the oxidizing atmosphere comprises air or a combustion gas.

9. The method of claim 1, wherein the sintering of the dried bond coat is carried out during operation of a component comprising the silicon-based substrate.

10. The method of claim 1, further comprising:
applying an environmental barrier coating (EBC) slurry on the dried bond coat, wherein the EBC slurry comprises an EBC patching material in an EBC fluid carrier, wherein the EBC patching material comprises an EBC powder and an EBC binder;
drying the EBC slurry on the dried bond coat to form a dried EBC; and
sintering the dried bond coat and the dried EBC in the oxidizing atmosphere to form the sintered bond coat on the silicon-based substrate and a sintered EBC on the sintered bond coat.

11. The method of claim 10, wherein the EBC powder comprises at least one of a rare earth monosilicate or a rare earth disilicate.

12. The method of claim 10, wherein the EBC powder has a particle size that is less than 1 micron.

13. The method of claim 10, wherein the EBC patching material further comprises an EBC sintering aid having a particle size that is less than 100 nanometers.

14. The method of claim 1, wherein the bond coat binder comprises a silicon-based resin material.

15. The method of claim 1, wherein the bond coat sintering aid has a particle size that is less than 1 micron.

16. The method of claim 1, wherein the bond coat sintering aid has a particle size that is less than 100 nanometers.

17. A method comprising:

applying a bond coat slurry on a silicon-based substrate, wherein the bond coat slurry comprises:

a bond coat patching material in a bond coat fluid carrier, wherein the bond coat patching material comprises a silicon-based powder, a bond coat binder, and a bond coat sintering aid, wherein the silicon-based powder comprises a plurality of small particles with a median particle size less than 100 nanometers, a plurality of medium particles with median particle size in a range from 1 micron to 6 microns, and a plurality of large particles with median particle size greater than 6 microns, wherein the plurality of small particles is present in an amount in a range from about 60 volume % to about 80 volume %, the plurality of medium particles is present in an amount in a range from about 10 volume % to about 30 volume %, and the plurality of large particles is present in an amount in a range from about 10 volume % to about 30 volume % of the volume of the silicon-based powder;

drying the bond coat slurry on the silicon-based substrate to form a dried bond coat; and sintering the silicon-based powder in the dried bond coat in an oxidizing atmosphere to form a sintered bond coat on the silicon-based substrate, wherein the sintered bond coat comprises a silicon-based phase and an oxide of the silicon-based phase, and the silicon-based phase comprises silicon, a silicon alloy, a metal silicide, or a combination thereof, wherein the oxide of the silicon-based phase in the sintered bond coat is present in an amount in a range of 25 volume % to 55 volume %.

* * * * *